（12) United States Patent
Katagawa et al.

(10) Patent No.: US 11,142,931 B2
(45) Date of Patent: Oct. 12, 2021

(54) VEHICLE DOOR LATCH DEVICE

(71) Applicant: Mitsui Kinzoku Act Corporation, Yokohama (JP)

(72) Inventors: Minetaka Katagawa, Yokohama (JP); Shintaro Okawa, Kawasaki (JP); Akifumi Omori, Yokohama (JP)

(73) Assignee: Mitsui Kinzoku Act Corporation, Kanagawa (JP)

(*) Notice: Subject to any disclaimer, the term of this patent is extended or adjusted under 35 U.S.C. 154(b) by 737 days.

(21) Appl. No.: 15/742,477

(22) PCT Filed: Apr. 27, 2016

(86) PCT No.: PCT/JP2016/063164
§ 371 (c)(1),
(2) Date: Jan. 5, 2018

(87) PCT Pub. No.: WO2017/006612
PCT Pub. Date: Jan. 12, 2017

(65) Prior Publication Data
US 2018/0195318 A1 Jul. 12, 2018

(30) Foreign Application Priority Data
Jul. 7, 2015 (JP) .............................. JP2015-136509

(51) Int. Cl.
*B60J 5/10* (2006.01)
*E05B 81/12* (2014.01)
(Continued)

(52) U.S. Cl.
CPC ............... *E05B 81/58* (2013.01); *B60J 5/10* (2013.01); *E05B 81/13* (2013.01); *E05B 81/14* (2013.01);
(Continued)

(58) Field of Classification Search
CPC .......... E05B 81/58; E05B 81/64; E05B 81/68; E05B 81/20; E05B 81/13; E05B 81/21;
(Continued)

(56) References Cited

U.S. PATENT DOCUMENTS 6,435,600 B1 * 8/2002 Long ..................... B60J 5/06
296/155
10,450,780 B2 * 10/2019 Tomaszewski ......... E05B 77/26

FOREIGN PATENT DOCUMENTS

JP 5-33540 A 2/1993
JP 2003-172052 A 6/2003
(Continued)

OTHER PUBLICATIONS

International Search Report and Written Opinion of the International Searching Authority, dated Jun. 28, 2016, for corresponding International Application No. PCT/JP2016/063164, 9 pages.

*Primary Examiner* — Kristina R Fulton
*Assistant Examiner* — Thomas L Neubauer
(74) *Attorney, Agent, or Firm* — Klarquist Sparkman, LLP

(57) ABSTRACT

Provided is a vehicle door latch device capable of shortening of energization time to an electrical drive source while a moving member is restrained by abutting against a stopper portion and improvement of durability of the electrical drive source. A control unit of the door latch device controls an electric motor for driving a sector gear in a release direction based on a door operation of an operation switch, and controls to stop a power supply to the electric motor when the latch is rotated from the full-latch position to the open position and a full-latch detecting switch is activated while the moving member is brought into abutment with the stopper portion and is stopped.

1 Claim, 9 Drawing Sheets

(51) Int. Cl.
  *E05B 81/20* (2014.01)
  *E05B 81/58* (2014.01)
  *E05B 81/14* (2014.01)
  *E05B 81/66* (2014.01)
  *E05B 81/64* (2014.01)
  *E05B 81/68* (2014.01)
  *E05B 81/16* (2014.01)
  *E05B 81/06* (2014.01)

(52) U.S. Cl.
  CPC .............. *E05B 81/15* (2013.01); *E05B 81/16* (2013.01); *E05B 81/20* (2013.01); *E05B 81/21* (2013.01); *E05B 81/64* (2013.01); *E05B 81/66* (2013.01); *E05B 81/68* (2013.01); *E05B 81/06* (2013.01)

(58) Field of Classification Search
  CPC .......... E05B 81/14; E05B 81/66; E05B 81/06; B60J 5/10
  See application file for complete search history.

(56) References Cited

FOREIGN PATENT DOCUMENTS

| | | |
|---|---|---|
| JP | 2013-49990 A | 3/2013 |
| JP | 2015-67971 A | 4/2015 |

* cited by examiner

VEHICLE DOOR LATCH DEVICE

CROSS REFERENCE TO RELATED APPLICATIONS

This is the U.S. National Stage of International Application No. PCT/JP2016/063164, filed Apr. 27, 2016, which in turn claims the benefit of and priority to Japanese Application No. 2015-136509, filed Jul. 7, 2015.

BACKGROUND OF THE INVENTION

Field of the Invention

The present invention relates to a door latch device for a vehicle capable of automatically opening a door by an electric drive source such as an electric motor.

DESCRIPTION OF THE INVENTION

A door latch device for a vehicle provided on a back door comprises, for example, a base member fixed to the door; a latch which is pivotally mounted to the base member and is engageable with a striker on a vehicle body side; a ratchet which engages with the latch to prevents the rotation of the latch in the release direction, an open lever as a moving member which is movable in the release direction where engagement with the latch is canceled, a sector gear as the moving member which is, while enabling opening of the back door by moving the open lever in a release direction, capable of forcibly closing the back door to a completely closed state from the improperly closed state by moving the latch from a half-latch position to a full-latch position; an electric motor as an electrical drive source for driving the sector gear, a full-latch detecting switch for detecting a full-latch position of the latch, and a half-latch detecting switch for detecting a half-latch position of the latch, etc. (See JP2013-49990 A).

SUMMARY OF THE INVENTION

In the door latch device disclosed in JP2013-49990, when opening the back door locked in the completely closed state, by operating a door opening operation switch for driving the electric motor in a door opening direction, moves the sector gear as the moving member and the open lever actuated by the sector gear in the release direction. As a result, the ratchet rotates in a direction in which engagement with the latch is released and the latch rotates in an opening direction to release the striker on the vehicle body side, thereby opening of the door is enabled.

In this case, although it is not disclosed in JP2013-49990 A, as for the electric motor, it is common that the electric motor is controlled to operate only for a certain period time, from starting of operation by operation of the door opening operation switch until stopping of the operation by detecting the half-latch position of the latch detected by the half-latch detecting switch. Still more, although it is not disclosed in JP2013-49990 A, as for the sector gear moved by the electric motor in the release direction from a neutral position (a standby position), generally, it is brought into abutment with a stopper portion prepared in the base member and then stops.

However, if the electric motor is stopped when the half-latch position of the latch is detected by the half-latch detecting switch, the operation time during the electric motor is operating in the door open direction becomes longer. In the case that stopping the motor when the sector gear is brought into abutment with the stopper portion, the electric current is supplied continuously to the electric motor even while the sector gear is restrained by abutting against the stopper portion. Because of that, since a force to rotate the electric motor in the door open direction occurs in the electric motor and the force is continuously applied to the electric motor, so that there is concern about durability when the electric motor is used for a long time.

In view of the above problems, it is an object of the present invention to provide a vehicle door latch device in which the energization time to an electrical drive source while the moving member is restrained by abutting against the stopper portion is shortened, and the durability of the electrical drive source is improved.

The above object is solved by the present invention as follows.

According to a first aspect of the present invention, there is provided a vehicle door latch device comprising:

a latch which is pivotally mounted to a base member and is rotatable from a full-latch position where the latch is engaged with a striker and capable of holding a door to a completely closed state to an open position where the latch releases the striker and allows opening of the door, via a half-latch position where the door is an improperly closed state;

a ratchet which is pivotally mounted to the base member and prevents the latch from turning in an opening direction by engaging with the latch at the full-latch position and at the half-latch position;

a moving member which is movable the ratchet from the full-latch position where the ratchet is engaged with the latch to a releasing direction where the latch is disengaged by moving from a standby position to the releasing direction, and the moving member is brought into abutment with a stopper portion provided on the base and stops when rotates to the utmost in the releasing direction;

an electrical drive source for driving the moving member in the releasing direction;

a full-latch detecting switch which is activated while the latch rotates from the full-latch position to the half-latch position; and a control unit for controlling operation of the electrical drive source, wherein the control unit controls the electrical drive source for driving the moving member in a release direction based on a door opening operation of an operation switch, and wherein the control unit controls to stop a power supply to the electrical drive source, when the latch is rotated from the full-latch position to the open position and the full-latch detecting switch is activated while the moving member is brought into abutment with the stopper portion and is stopped.

According to a second aspect of the present invention, in the vehicle door latch device according to the first aspect of the present invention, further comprising a half-latch detecting switch, wherein the half-latch detecting switch is activated in a position where the latch is slightly beyond the half-latch position, wherein the control unit controls the electrical drive source to rotate reversely when the half-latch detecting switch is activated, thereby returning the moving member from a release position to the standby position.

According to the present invention, since the control unit controls the electrical drive source to drive the moving member in the release direction based on the door opening operation of the operation switch, and controls to stop power supply to the electrical drive source when the latch is rotated from the full-latch position to the open position and the full-latch detecting switch is activated while the moving member is brought into abutment with the stopper portion and is stopped, so that, the energization time to the electrical drive source while the moving member is restrained by abutting against the stopper portion is shortened, and the durability of the electrical drive source is improved.

DETAILED DESCRIPTION OF THE INVENTION

Hereinafter, an embodiment of a vehicle door latch device according to the present invention will be described with reference to the drawings.

Figure 2:
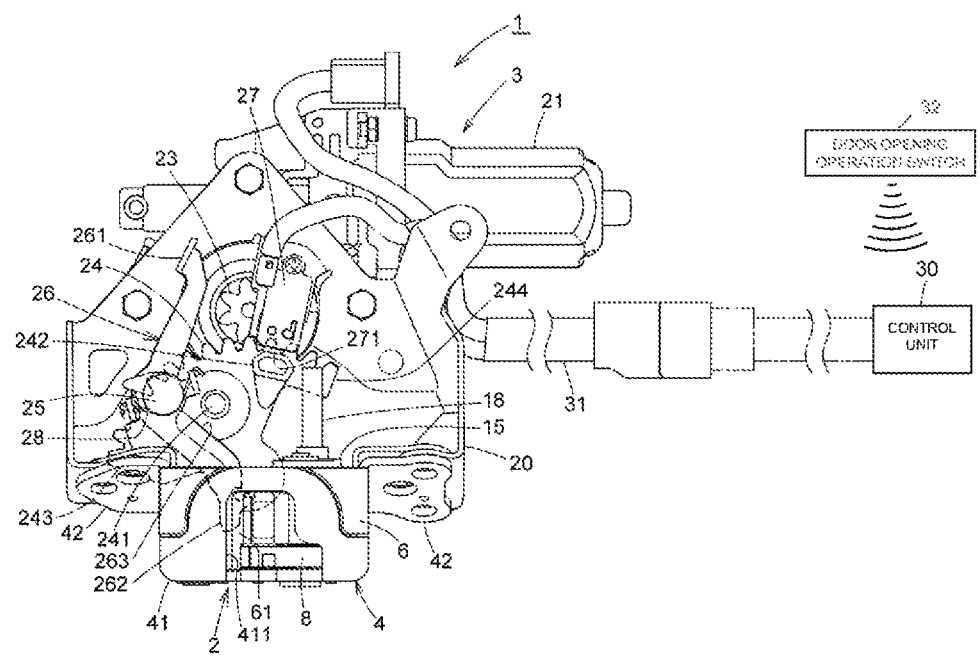
FIG. 2 is a front view of the door latch device.

In the following explanation, the front side in FIG. 2 is called a "front side", the back side in FIG. 2 is called a "backside", and the horizontal direction is called a "horizontal direction."

Figure 1:
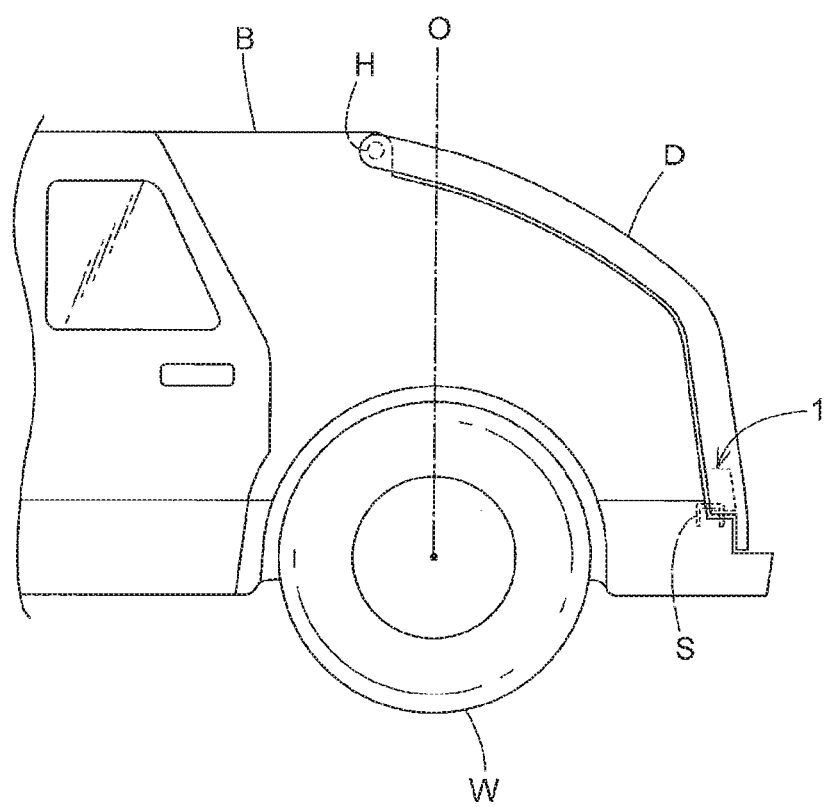
FIG. 1 is a side view of a motor vehicle equipped with a door latch device according to the present invention.
Figure 3:
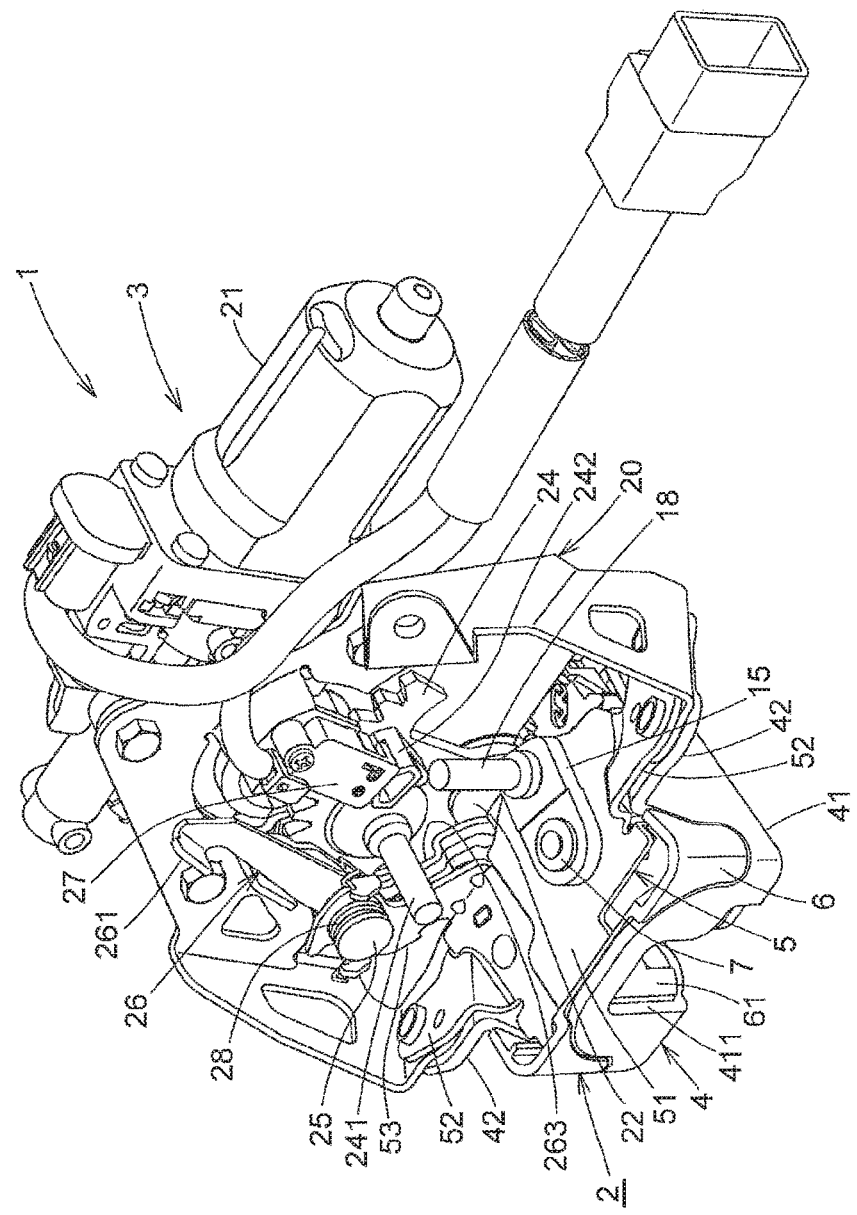
FIG. 3 is a perspective view of the door latch device.

As shown in FIGS. 1-3, a door latch device 1 according to the present invention is provided at the lower end of a back door (hereinafter, abbreviated as a door) D which is pivotally mounted to the upper end to the rear end of a vehicle body B via a hinge shaft H enabling to open and close vertically, in a front position a little from the center O of the rear wheel W of the vehicle.

The door latch device 1 comprises an engagement unit 2 that engages with a striker S fixed to the vehicle body which is fixed to the back lower part of the body B to hold the door D at a completely closed position, and an operation unit 3 that provides a closing function in which the operation unit 3 compulsorily shuts the engagement unit 2 with electromotive power from a half-latch state (an improperly door closed state) to a full-latch state (a completely closed door state), and a releasing function for releasing the engagement of the engagement unit 2 enabling the door to open.

Figure 4:
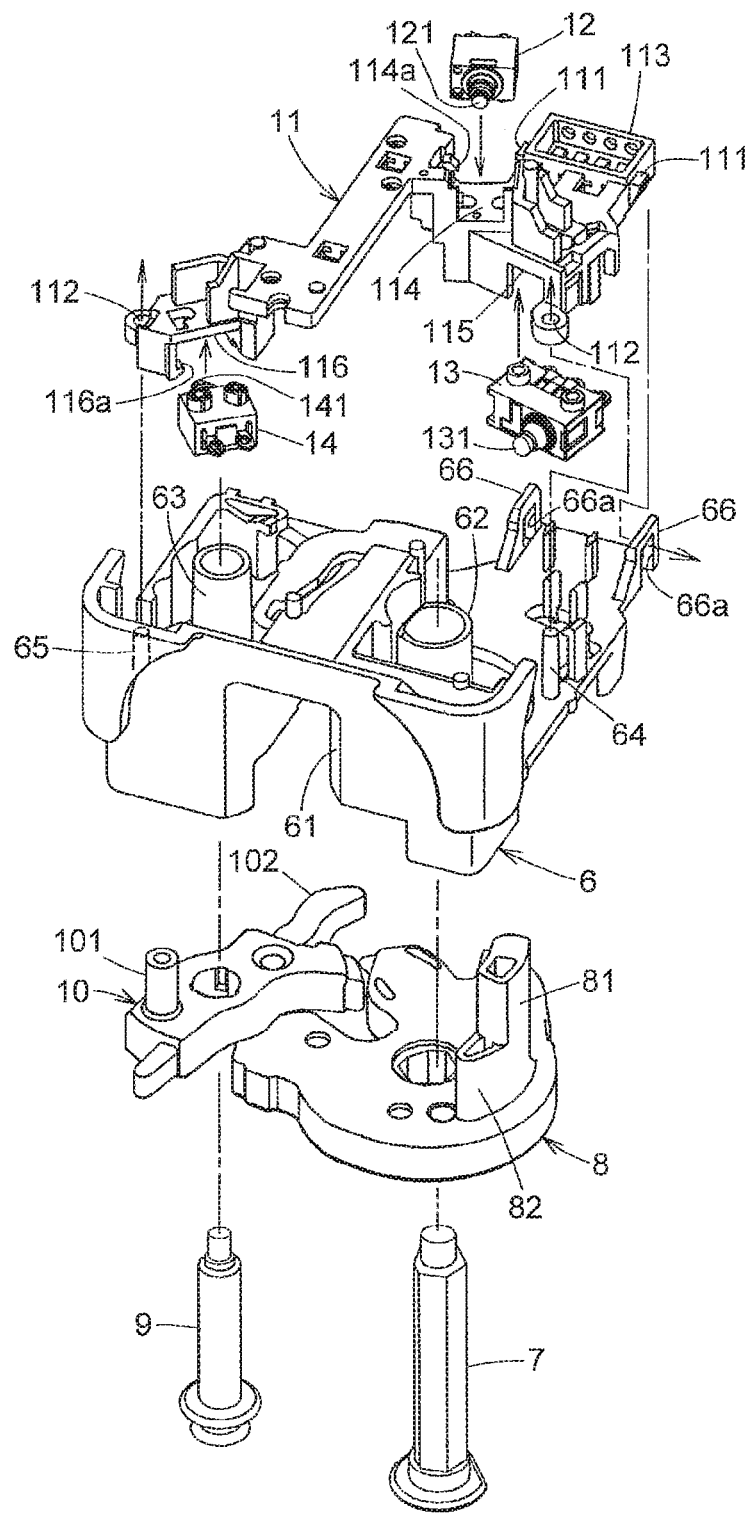
FIG. 4 is an exploded perspective view of a principal part of an engagement unit of the door latch device.
Figure 5:
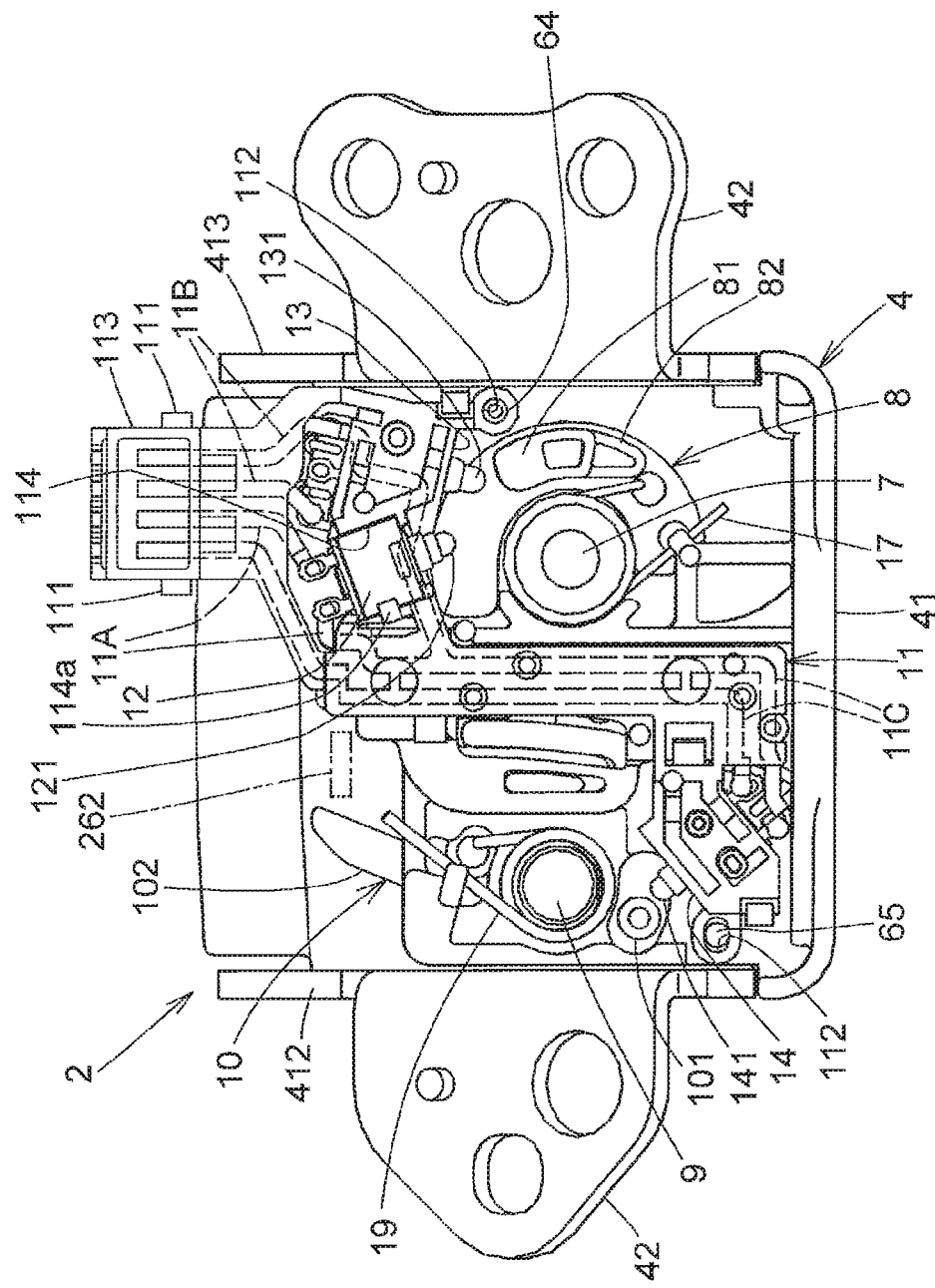
FIG. 5 is a plan view of the engagement unit from which an operation unit and a back plate is removed.
Figure 6:
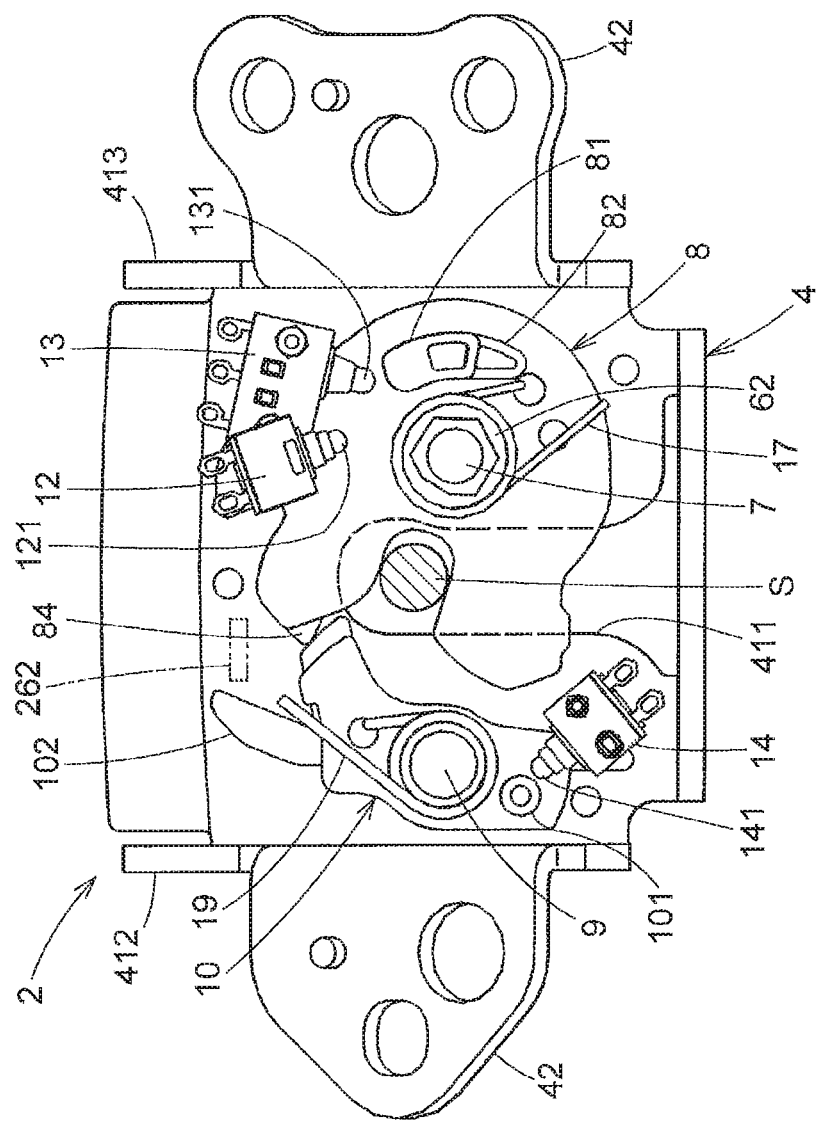
FIG. 6 is a plan view of the engagement unit in a full-latch state from which the operation unit, a body, and the back plate are removed.

As shown in FIGS. 4 and 6, the engagement unit 2 comprises a metal cover plate 4 which is fixed to the lower end of the door D with a bolt (not shown) to form a base member; a metal back plate 5 provided on the cover plate 4 and is fixed to the door D with the cover plate 4; a synthetic resin body 6 fixed between the cover plate 4 and the back plate 5 to form the base member; a latch 8 which is pivotally supported by a latch shaft 7 between the upper surface of the cover plate 4 and the lower surface of the body 6; a ratchet 10 which is pivotally supported by a latch shaft 9 between the upper surface of the cover plate 4 and the lower surface of the body 6; a synthetic resin switch plate 11 in which a half-latch conductive plate 11A, a full-latch conductive plate 11B and a ratchet conductive plate 11C are formed by insert molding (See FIG. 5); a half-latch detecting switch 12 which detects a half-latch position of the latch 8; a full-latch detecting switch 13 which detects a full-latch positions of the latch 8; a ratchet-detecting switch 14 which detects that the ratchet 10 is rotated to the open position; and a latch lever 15 capable of rotating with the latch 8.

The cover plate 4 has a base 41 for supporting the body 6, and mounting portions 42, 42 which are integrally formed on both right-and-left sides of the base 41 for fixing to the door D. Almost in the center of the base 41, there is formed a striker-engagement groove 411 in which the striker S enters when the door D is closed.

The back plate 5 comprises a base 51 which holds the upper surface of the body 6, and left and right mounting portions 52, 52 integrally formed on both sides of the base 51 and respectively overlapping the upper side of both mounting portions 42, 42 of the cover plate 4. The base 51 is integrally molded with the mounting portions 52, 52. Both mounting portions 52, 52 are fixed to the door D with both pieces 42, 42 through a base plate 20 mentioned later.

As shown in FIG. 4, almost in the center part in the horizontal direction of the body 6, there are integrally formed a striker-engagement groove 61 which is overlapped on the striker-engagement groove 411 of the cover plate 4 and is opened forward and downward; a cylindrical support portion 62 penetrating in the vertical direction provided on the right side of the striker-engagement groove 61; a cylindrical support portion 63 penetrating in the vertical direction at the left of the striker-engagement groove 61; positioning projections 64, 65 projecting upward in a cylindrical shape for positioning the right-and-left both sides of the switch plate 11, and a pair of right-and-left upward holding portions 66, 66 for holding the rear portion of the switch plate 11 from both the right-and-left sides. In the both upward holding portions 66, 66, engagement holes 66a, 66a are formed in which a pair of right-and-left sides engagement pawls 111, 111 engage elasticity from above.

Between the cover plate 4 and the body 6, the latch 8 is pivotally supported via the vertical latch shaft 7 which is rotatably disposed in the cylindrical support portion 62 of the body 6. The latch 8 is forced by a spring 17 wound on the cylindrical support portion 62 in an opening direction (a counter-clockwise direction in FIG. 6). Along with the closing operation of the door D, the latch 8 turns from the open position (the position shown in FIG. 8) where the latch does not engage with the striker S to a full-latch position (the position shown in FIG. 6) where the latch completely engages with the striker S via the half-latch position (the position shown in FIG. 7) where the latch slightly engages with the striker S. The latch 8 rotates to an opposite direction when the opening operation of the door D.

Surface of the latch 8 is molded with synthetic resin, and on a rotary surface of the latch 8, a first detected portion 81 and a second detected portion 82 which is lower position than the first detected portion 81 are integrally molded with the latch 8. The first and the second detected portions 81, 82 penetrate the body 6 from the bottom and protrude to the upper surface of the body 6.

The latch lever 15 is fixed to the upper end of the latch shaft 7 so that the latch lever is rotatable integrally with the latch 8. At a rotating end of the latch lever 15 facing to rear direction, a cylindrical projecting shaft 18 projecting upward is fixed.

Figure 7:
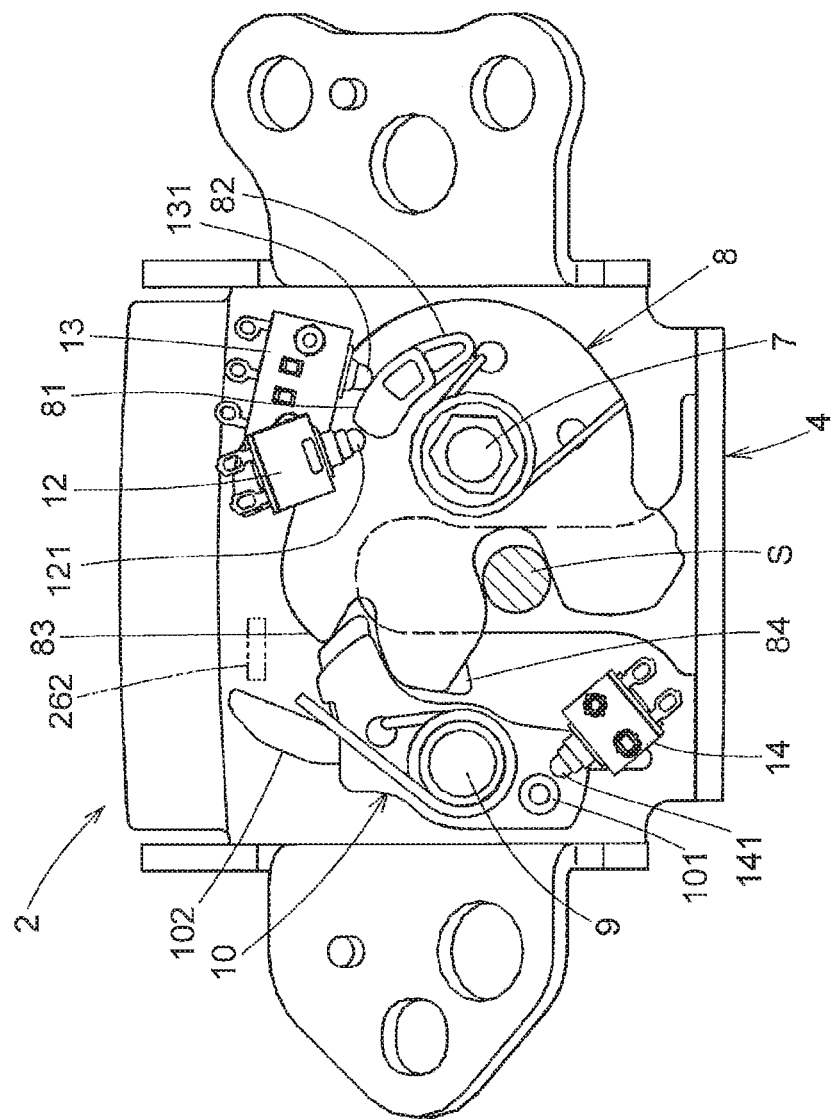
FIG. 7 is a plan view of the engagement unit in a half-latch state.

Between the cover plate 4 and the body 6, the ratchet 10 is pivotally supported via the vertical ratchet shaft 9 which is rotatably disposed in the cylindrical support portion 63 of the body 6. The ratchet 10 is forced by a spring 19 wound on the cylindrical support portion 63 in a direction of engagement (a clockwise direction in FIG. 6). As the latch 8 rotates with the closing operation of the door D from the open position to the half-latch position, the ratchet 10 engages with a half-latch pawl 83 provided on the outer periphery of the latch 8 by force of the spring 19, as shown in FIG. 7, and as the latch 8 rotates to the full-latch position, the ratchet 10 engages with a full-latch pawl 84 of the latch 8 so that rotation of the latch 8 in the opening direction (a counterclockwise direction in FIG. 6) is prevented. At the front end of the ratchet 10A, a cylindrical detected portion 101 projecting upwardly is fixed, and the detected portion 101 penetrates the body 6 from the bottom and projects to the upper surface of the body 6.

As shown in FIG. 7, when the ratchet 10 engages with the half-latch pawl 83 of the latch 8, the latch 8 is prevented from turning from the half-latch position to the opening direction (in the counterclockwise direction in FIG. 7), so that the door D is held in the position in which the door D is not shut properly. Still more, as shown in FIG. 6, when the ratchet 10 engages with the full-latch pawl 84 of the latch 8, the latch 8 is held in the full-latch position, so that the door D is held in the completely-closed position. When the ratchet 10 turns in the releasing direction (in the counterclockwise direction in FIGS. 6 and 7) against the force of the spring 19, the ratchet 10 is disengaged from the half-latch pawl 83 or full-latch pawl 84, thereby the engagement between the latch 8 and the striker S is released, so that opening of the door D is enabled.

As shown in FIGS. 4 and 5, the switch plate 11 is positioned and mounted to the upper surface of the body 6, while fitting the backend part of the right-hand side of the switch plate 11 between the upward holding portions 66, 66 in the backend part tops of the body 6, by elastically engaging and holding the pair of right-and-left sides engagement pawls 111, 111 to both of the engagement holes 66a, 66a, fitting the positioning holes 112, 112 provided on the right-and-left sides of the switch plate 11 to the positioning projections 64, 65 formed in the body 6. Still more, the switch plate 11 is pressed downward in an immovable state by the back plate 5 fixed to the body 6 as covers the upper surface of the body 6. Therefore, any fastener means for fixing the switch plate 11, such as screw etc., is unnecessary.

The operation unit 3 comprises: a metal base plate 20 which is fixed to the cover plate 4 of the engagement unit 2 and the door D and serves as an attachment bracket; an electric motor 21 which is fixed to the back surface of the base plate 20 and serves as a source of an electric drive; a sector gear 24 which is pivotally supported by a pivot shaft 22 facing to a longitudinal direction on the front surface of the base plate 20 and is meshed with a pinion gear 23 which reduces and transmits rotation of the electric motor 21 via a worm and a worm wheel (not shown); an opening lever 26 pivotally supported to an upward bent portion 53 of the back plate 5 of the engagement unit 2 by a shaft 25 facing to a longitudinal direction; and a sector gear detecting switch 27 which is capable of detecting a turning position of the sector gear 24. In addition, the sector gear 24 and the opening lever 26 correspond to a moving member (24, 26) in the present invention.

The opening lever 26 is held in a standby position (the position shown in FIGS. 2, 3) with a spring 28 wound on the support shaft 25. At the upper portion of the opening lever 26, a motion input portion 261 for inputting a door opening operation force of a door handle (not shown) disposed on the exterior of the door D is provided. At the lower portion of the opening lever 26, an abutting portion 262 capable of abutment with a rear end 102 of the ratchet 10 is provided (refer to FIG. 2, FIGS. 6-8).

When the door handle of the door D is operated to open the door, an operating part of the door handle is brought into abutment with the motion input portion 261 of the opening lever 26, so that the opening lever 26 turns from the standby position to the releasing direction (in a clockwise direction in FIG. 2) against the force of the spring 28, and the abutting portion 262 is brought into abutment with the rear end 102 of the ratchet 10, so that the ratchet 10 is turned in the releasing direction and the door D can be opened.

The sector gear 24 comprises a cylindrical pressing shaft portion 241 which projects forward from its rotating surface, and a detected portion 242. When the pinion gear 23 rotates with forward rotation of the electric motor 21, the sector gear 24 rotates in the releasing direction (in the counterclockwise direction in FIG. 2) from a neutral position as the standby position (the position shown in FIG. 2). When the pinion gear 23 rotates with reverse rotation of the electric motor 21, the sector gear 24 rotates from the standby position to a closing direction (in the clockwise direction in FIG. 2).

When the sector gear 24 rotates to the utmost in the release direction, a left-hand side end 243 of the sector gear 24 is brought into abutment with the upper surface of a stopper portion for release 412 (see FIG. 5) formed in the backend part on the left-hand side of the base 41 in the cover plate 4 and stops. When the sector gear 24 rotates to the utmost in the close direction from the neutral position, a right-hand side end 244 is brought into abutment with the upper surface of a stopper portion for closing 413 formed in the right-hand side back end part of the base 41 in the cover plate 4 and stops.

When a door opening operation switch 32 is operated while the door D is closed, a control unit 30 provided an appropriate place in the vehicle body controls the electric motor 21 to rotate forward direction. Thus, the sector gear 24 turns in the releasing direction from the neutral position with the driving force of the electric motor 21, and the left side of the pressing shaft portion 241 is brought into abutment with an abutted portion 263 provided on the right-side edge of the opening lever 26 from the right side and rotates the opening lever 26 from the standby position to the release direction. Thereby, the abutting portion 262 presses the rear end 102 of the ratchet 10 in the counterclockwise direction, and the engagement between the latch 8 and the ratchet 10 is canceled, so that the door D can be opened. Still more, the sector gear 24 is constituted such that, after rotating the opening lever 26 in the release direction, the left-hand side end 243 is brought into abutment with the stopper portion for release 412 of the cover plate 4 and stops.

Figure 8:
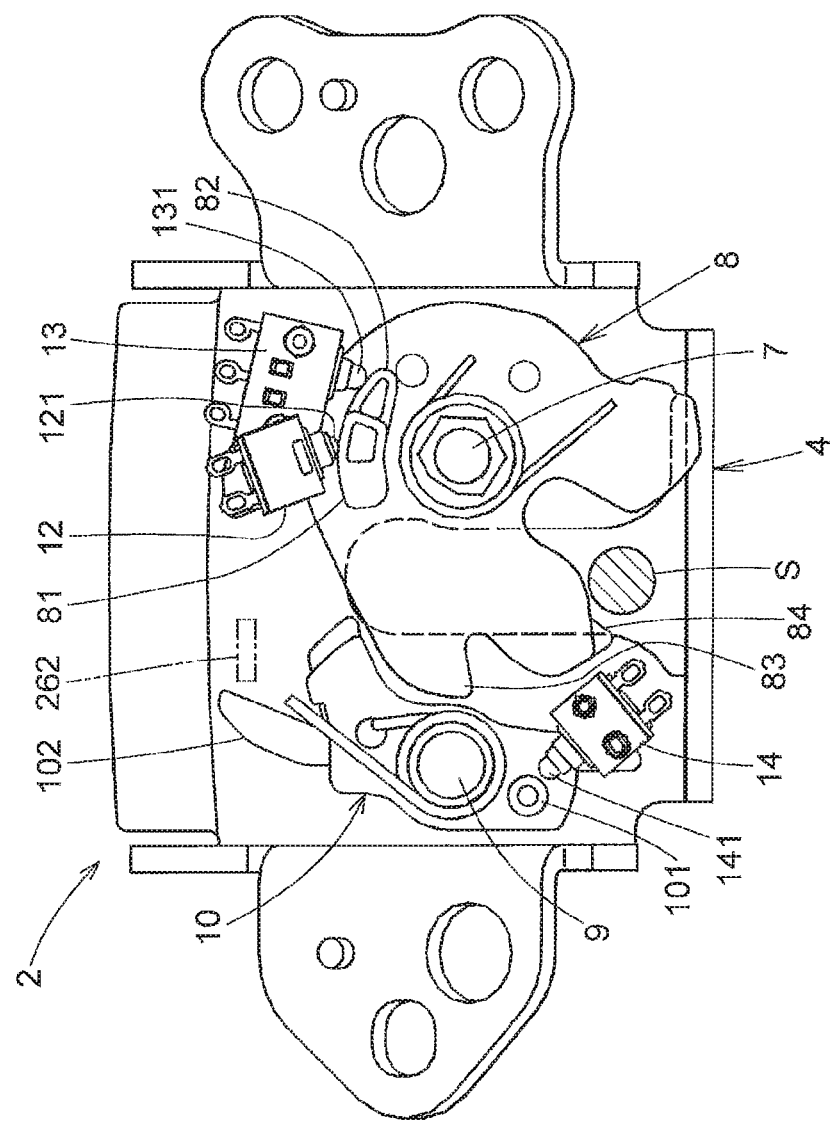
FIG. 8 is a plan view of the engagement unit in a state when the latch is rotated to an open position.

Furthermore, regarding to the half-latch detecting switch 12, with following the closing operation of the door D, when the latch 8 turns from the open position shown in FIG. 8 to just before the half-latch position shown in FIG. 7, a detecting portion 121 leaves from the outer circumferential surface of the first detected portion 81 of the latch 8 and the half-latch detecting switch 12 turns from ON to OFF, so that it is assumed that the latch 8 has rotated in the half-latch position. A half-latch detecting signal of the latch 8 detected by the half-latch detecting switch 12 is transmitted to the control unit 30, and the control unit 30 controls the electric motor 21 to rotate forward direction.

Thus, the sector gear 24 turns in the closing direction from the neutral position with the driving force of the electric motor 21, and the right-side surface of the pressing shaft portion 241 is brought into abutment with the projecting shaft 18 of the latch lever 15 from left side, so that the latch lever 15 is rotated in clockwise direction in a plane view. Thereby, the latch 8 turns from the half-latch position to the full-latch position with the latch lever 15, so that the door D is forcedly closed from a slightly-open state to the completely closed state.

Regarding to the half-latch detecting switch 12, with following the opening operation of the door D, while the latch 8 turns from the full-latch position shown in FIG. 6 to the open position shown in FIG. 8 and immediately after passing through the half-latch position, as the detecting portion 121 is pushed in by a first detected portion 81 of the latch 8 and the half-latch detecting switch 12 turns from OFF to ON, so that it is detected that the latch 8 has passed through the half-latch position. This half-latch detecting signal is transmitted to the control unit 30, and the control unit 30 controls the electric motor 21 to rotate reversely. Thereby, the sector gear 24 returns to the neutral position, and the pressing shaft portion 241 is separated from the abutted portion 263 of the opening lever 26, so that the opening lever 26 returns to an original position by urging force of the spring 28.

Regarding to the full-latch detecting switch 13, with following the closing operation of the door D, when the latch 8 turns to the full-latch position shown in FIG. 6, just before the full-latch position, a detecting portion 131 of the full-latch detecting switch 13 leaves from the outer circumferential surface of the second detected portion 82 of the latch 8, and the full-latch detecting switch 13 turns from ON to OFF, so that it is assumed that the latch 8 has rotated in the full-latch position. A full-latch detecting signal of the latch 8 detected by the full-latch detecting switch 13 is transmitted to the control unit 30, and the control unit 30 controls the electric motor 21 to rotate reverse direction for returning the sector gear 24 to the neutral position.

In addition, the full-latch detecting switch 13 serves also as a room light switch which turn on and turn off a room lamp inside the vehicle. When the full-latch detecting switch 13 turns from ON to OFF, the room light is turned off, and when turns from OFF to ON, the room light is turned on.

The sector-gear-detecting switch 27 detects a neutral position of the sector gear 24, when the sector gear 24 is in the neutral position, by contacting a retractable detecting portion 271 with the detected portion 242 of the sector gear 24. A detected signal in the sector-gear-detecting switch 27 is transmitted to the control unit 30 and the control unit 30 controls to stops the electric motor 21 based on the neutral signal detected by the sector-gear-detecting switch 27.

In the backend part of the switch plate 11, a coupler 113 is integrally molded, and inside of the coupler, each of connection terminals of the half-latch conductive plate 11A, the full-latch conductive plate 11B and the ratchet conductive plate 11C are exposed. An external connector (not shown) is connected to this coupler 113 for electrically connecting to the control unit 30 through a wire harness 31.

In the switch plate 11, at the right side of the striker-engagement groove 61 of the body 6, it is provided with a concave half-latch detecting switch holding portion 114 which has an upward opening wherein the half-latch detecting switch 12 can be fit from the upper side, and an elastic pawl 114a which is engageable with an upper surface of the half-latch detecting switch 12 and capable of holding the half-latch detecting switch 12.

Still more, at the right side of the switch plate 11 near the half-latch detecting switch holding portion 114, it is provided with a concave full-latch-detecting-switch holding portion 115 which has a downward opening wherein the half-latch detecting switch 13 can be fit from the bottom side, and an elastic pawl (not shown) which engageable with a lower surface of the half-latch detecting switch 13 and capable of holding the half-latch detecting switch 13.

Further, at the left side of the striker-engagement groove 61 of the body 6, it is provided with a concave ratchet-detecting switch holding portion 116 which has a downward opening wherein the ratchet-detecting switch 14 can be fit from the bottom side, and an elastic pawl 116a which engageable with a lower surface of the ratchet-detecting switch 14 and capable of holding the ratchet-detecting switch 14.

The half-latch detecting switch 12 is electrically connected to a connection terminal part (not shown) of the half-latch conductive plate 11A exposed in the half-latch detecting switch holding portion 114, the full-latch detecting switch 13 is electrically connected to a connection terminal part (not shown) of the full-latch conductive plate 11B exposed in the full-latch-detecting-switch holding portion 115, and the ratchet-detecting switch 14 is electrically connected to a connection terminal part (not shown) of the ratchet conductive plate 11C exposed in the ratchet-detecting switch holding portion 116, respectively.

As shown FIGS. 5-8, the half-latch detecting switch 12 is hold in the half-latch detecting switch holding portion 114 such that the retractable detecting portion 121 can be opposed to the rotation locus of the outer peripheral surface of the first detected portion 81 provided on the latch 8.

The full-latch detecting switch 13 is hold in the full-latch detecting switch holding portion 115 such that the retractable detecting portion 131 can be opposed to the rotation locus of the outer peripheral surface of the second detected portion 82 provided on the latch 8.

The ratchet-detecting switch 14 is hold in the full-latch detecting switch holding portion 116 such that the retractable detecting portion 141 can be opposed to the rotation locus of the outer peripheral surface of the detected portion 101 provided on the ratchet 10.

Regarding to the ratchet detecting switch 14, when the ratchet 10 turns in the releasing direction from the engagement position, the detected portion 101 of the ratchet 10 contacts with the detecting portion 141, and the ratchet detecting switch 14 turns from OFF to ON, so that it is detected that the ratchet 10 has turned to the release position. A release detecting signal of the ratchet 10 detected by the ratchet detecting switch 14 is transmitted to the control unit 30.

Figure 9:
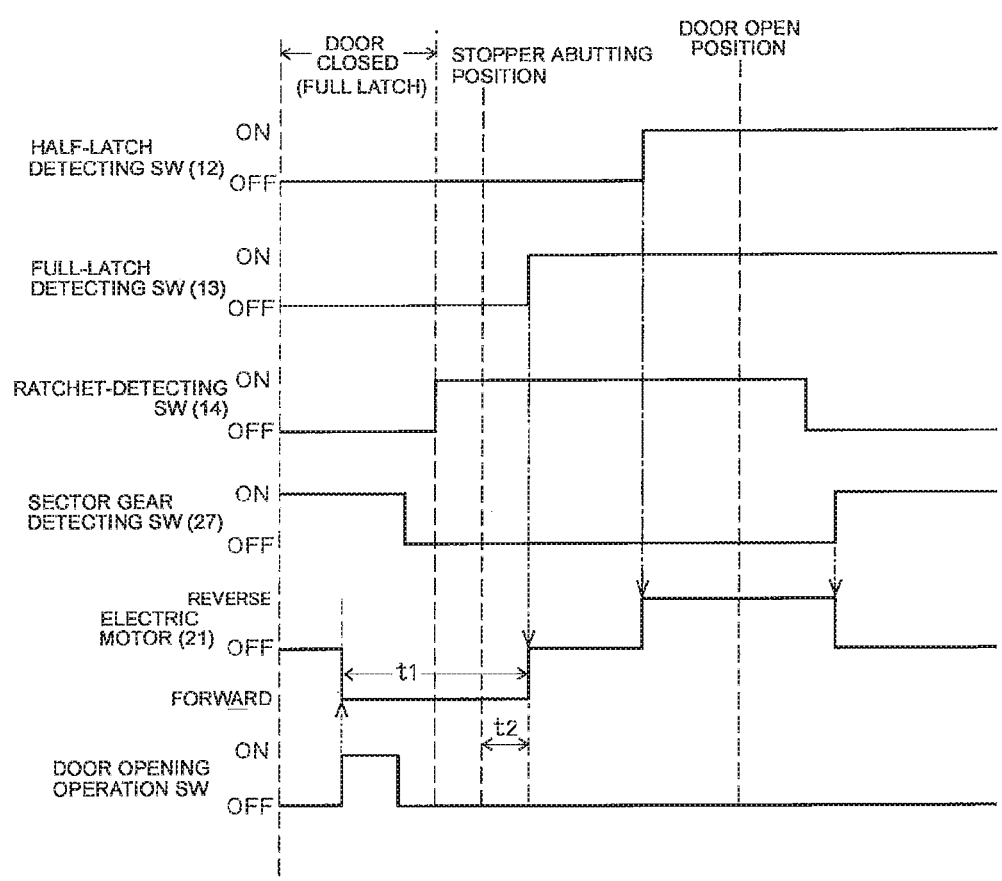
FIG. 9 is a timing chart for explaining the operation timing of each of detecting switches and an electric motor.

Next, the operation timing of each of detecting switches and the electric motor at the time of opening the door will be described with reference to the timing chart in FIG. 9.

When the door D is closed, if a door opening operation switch (not shown) is turned ON (a door opening operation), the control device 30 drives and controls the electric motor 21 in the forward rotation direction (in the release direction). Thereby, the sector gear 24 rotates a predetermined angle in the release direction from the neutral position, and the left-hand side end 243 of the sector gear 24 is brought into abutment with the stopper portion for release 412 of the cover plate 4, and stops.

If the sector gear 24 rotates in the release direction, since the opening lever 26 and the ratchet 10 are rotated in the release direction, the ratchet detecting switch 14 is turned ON. As mentioned above, since the sector gear 24 is brought into abutment with the stopper portion for release 412 and stops after rotating the opening lever 26 in the release direction, the ratchet detecting switch 14 is set to ON before the stopper abutting position. In addition, the electric motor 21 is controlled to continue rotating for a predetermined period, when the ratchet detecting switch 14 is turned ON and even while the sector gear 24 is brought into abutting with the stopper portion for release 412 and is restrained.

When the ratchet 10 rotates in the release direction and the latch 8 rotates a little in an open position direction from the full-latch position, the full-latch detecting switch 13 is turned ON, and based on the ON signal, the control unit 30 controls the electric motor 21 to be stopped. Moreover, at the same time when the full-latch detecting switch 13 is turned ON, the control unit 30 turns on the room light.

Since an operating time of the motor 21 based on the opening operation of the door D, namely the operating time (t1) from starting of rotation of the electric motor 21 by the door opening operation switch to stopping the electric motor is very short, so that a stopping time (t2) from the sector gear 24 is brought into abutment with the stopper portion for release 412 to stopping the electric motor is also shortened. As a result, an energization time of the electric motor is extremely shortened, during the sector gear 24 is brought into abutting with the stopper portion for release 412 and is restrained.

If the latch 8 rotates in the open position direction up to the position slightly beyond the half-latch position shown in FIG. 7, since the detecting portion 121 of the half-latch detecting switch 12 contacts with the first detected portion 81 of the latch 8 and is pushed in, so that the half-latch detecting switch 12 is turned ON. While the electric motor 21 is controlled to stop until the half-latch detecting switch 12 is turned ON, and based on this ON signal, the control device 30 controls the electric motor 21 to rotate reversely. When the sector gear 24 returns to the neutral position by rotating the electric motor 21 reversely, the sector-gear-detecting switch 27 is turned ON, so that the control unit 30 stops the reverse rotation of the electric motor 21. In addition, after the half-latch detecting switch 12 is turned ON, the ratchet detecting switch 14 is maintained the ON state and continues to detect the opening position of the ratchet 10, until the door is openable.

In addition, since the half-latch detecting switch 12 is turned ON in a position where the latch 8 is slightly beyond the half-latch position, until the half-latch detecting switch 12 is turned ON and the electric motor 21 is rotated reversely, the sector gear 24, the opening lever 26 and the ratchet 10 are held in the release position, so that, even if the electric motor 21 is stopped by the operation of the full-latch detecting switch 13, the ratchet 10 does not engage with the half-latch pawl 83 of the latch 8. Therefore, during the opening operation of the door, there is no possibility that the latch 8 will stop at the half-latch position and being in the improperly door closed state.

As explained above, according to the door latch device concerning the above embodiment, when making the door D openable, since the stopping time (t2) from the sector gear 24 is brought into abutment with the stopper portion for release 412 to stopping the electric motor 21 is shortened, and the energization time to the electric motor 21 becomes considerably short while the sector gear 24 is brought into abutment with the stopper portion for release 412 and is restrained, so that the load added to the electric motor 21 is reduced and the durability of the electric motor can be improved. Moreover, it is possible to prevent wear of a contact portion between the sector gear 24 and the stopper part for release 412 and to prevent the stopper portion for release 412 being damaged.

The embodiment of the present invention is described as above, but it is available to make changes and modifications without departing from the scope of claims.

In the above embodiment, the door latch device comprises the closing function compulsorily shuts the door D from the improperly closed state to the completely closed state, and the releasing function for releasing the engagement of the engagement unit 2 to enable the door D to open, but the present invention can be applied to a door latch device having only the releasing function.

Moreover, with the above-embodiment, although the sector gear 24 is driven by the electric motor 21, it is also available to use of another electrical drive source, such as solenoid etc.

With the above-embodiment, although the door latch device is attached to the back door D, it is also available to apply the present invention to the door latch device for a side door or a sliding door.

What is claimed is:

1. A vehicle door latch device comprising:
   a latch which is pivotally mounted to a base member and is rotatable from a full-latch position where the latch is engaged with a striker and capable of holding a door to a completely closed state to an open position where the latch releases the striker and allows opening of the door, via a half-latch position where the door is an improperly closed state;
   a ratchet which is pivotally mounted to the base member and prevents the latch from turning in an opening direction by engaging with the latch at the full-latch position and at the half-latch position;
   a moving member having an open lever, a sector gear driven by an electrical drive source and rotated from a neutral position to a releasing direction or to a close direction, and a sector gear detection switch;
   wherein the open lever urges the ratchet toward the full-latch position forced by a spring and moves the ratchet from the full-latch position where the ratchet is engaged with the latch by moving from the neutral position to the releasing direction, and the open lever is brought into abutment with a stopper portion provided on the base and stops when rotated to the utmost in the releasing direction,
   wherein the sector gear rotates the open lever from the neutral position to the releasing direction with forward rotation of the electrical drive source and returns to the neutral position with reverse rotation of the electrical drive source, and
   wherein the sector gear detection switch detects the neutral position of the sector gear and outputs a neutral detection signal;
   a full-latch detecting switch which is activated while the latch rotates from the full-latch position to the half-latch position;
   a ratchet detection switch that detects that the ratchet has turned to a release position where the ratchet disengages from the latch in the full latch position, before the open lever comes into abutment with the stopper portion for release and stops, based on the movement of the moving member in the releasing direction, by driving the electrical drive source;
   a half-latch detecting switch that detects the half-latch position of the latch; and a control unit for controlling operation of the electrical drive source;

wherein the control unit controls the electrical drive source for driving the sector gear in the releasing direction based on a door opening operation of an operation switch, wherein the control unit controls to stop a power supply to the electrical drive source, when the latch is rotated from the full-latch position to the open position and the full-latch detecting switch is activated while the ratchet detection switch detects the movement of the ratchet to the release position and the open lever is brought into abutment with the stopper portion and is stopped, wherein the half-latch detecting switch is activated when the latch rotates in the open position direction from the full latch position to a position slightly beyond the half-latch position, and wherein the control unit controls the electrical drive source to rotate reversely when the half-latch detecting switch is activated, thereby returning the sector gear from the release position to the neutral position, whereby the sector gear, the open lever, and the ratchet are held in the release position after driving the sector gear in the releasing direction until the electrical drive source is reversely controlled.

* * * * *